US007958376B2

(12) United States Patent
Glen

(10) Patent No.: US 7,958,376 B2
(45) Date of Patent: *Jun. 7, 2011

(54) WRITE ONCE SYSTEM AND METHOD FOR FACILITATING DIGITAL ENCRYPTED TRANSMISSIONS

(75) Inventor: David I. J. Glen, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 719 days.

This patent is subject to a terminal disclaimer.

(21) Appl. No.: 11/649,612

(22) Filed: Jan. 4, 2007

(65) Prior Publication Data

US 2007/0113102 A1 May 17, 2007

Related U.S. Application Data

(63) Continuation-in-part of application No. 09/704,329, filed on Nov. 2, 2000, now Pat. No. 7,178,035.

(51) Int. Cl.
*G06F 12/14* (2006.01)

(52) U.S. Cl. ............... 713/193; 713/165; 711/100

(58) Field of Classification Search .......... 380/200–202, 380/228, 277, 278, 280; 713/193, 194, 165; 726/26–30; 711/1, 100, 128, 139, 145; 369/13.01, 369/13.56, 13.16
See application file for complete search history.

(56) References Cited

U.S. PATENT DOCUMENTS

| 4,388,695 A | 6/1983 | Heinemann | |
|---|---|---|---|
| 4,825,358 A | 4/1989 | Letwin | |
| 5,224,166 A | 6/1993 | Hartmann, Jr. | |
| 5,421,006 A | 5/1995 | Jablon et al. | |
| 5,539,478 A | 7/1996 | Bertram et al. | |
| 5,592,556 A | 1/1997 | Schwed | |
| 5,606,610 A | 2/1997 | Johansson | |
| 5,752,009 A * | 5/1998 | Nakahara et al. | 703/23 |
| 5,883,958 A * | 3/1999 | Ishiguro et al. | 705/57 |
| 6,209,069 B1 * | 3/2001 | Baltar | 711/163 |
| 6,356,753 B1 * | 3/2002 | Kolev et al. | 455/411 |
| 6,378,072 B1 | 4/2002 | Collins et al. | |
| 6,385,152 B1 | 5/2002 | Fujinami et al. | |
| 6,507,904 B1 | 1/2003 | Ellison et al. | |
| 6,542,160 B1 | 4/2003 | Abgrall | |
| 6,571,220 B1 * | 5/2003 | Ogino et al. | 705/51 |
| 6,598,135 B1 * | 7/2003 | MacLeod | 711/163 |
| 6,754,678 B2 | 6/2004 | Norris et al. | |
| 6,820,203 B1 * | 11/2004 | Okaue et al. | 713/193 |
| 6,845,450 B1 | 1/2005 | Kobayashi et al. | |

(Continued)

*Primary Examiner* — Nirav B Patel
(74) *Attorney, Agent, or Firm* — Volpe and Koenig, P.C.

(57) ABSTRACT

A digital interface device is provided for facilitating key encryption of a digital signal which is communicated from a computer system to an associated peripheral device, such as a digital display device. The digital interface device has a digital output, digital output formatting circuitry associated with the output and a non-volatile RAM for storing a basic input/output system (BIOS) for, inter alia, controlling digital output formatting. The interface device is configured such that the non-volatile RAM has a specific addressable write-protectable area allocated for storing an encryption key flag at a flag address along with encryption key data. The write-protectable area is rendered read-only when a predetermined flag value is stored at the flag address. Thus, encryption key data may be stored in the specific write-protectable area of the non-volatile RAM in connection with storing the predetermined flag at that flag address such that encryption data cannot be altered when the flash RAM is subsequently written to, such as when a BIOS stored in the non-volatile RAM is updated.

20 Claims, 1 Drawing Sheet

U.S. PATENT DOCUMENTS 6,938,162 B1 * 8/2005 Nagai et al. .................. 713/189
7,178,035 B1 * 2/2007 Glen ............................. 713/189
7,178,036 B1 * 2/2007 Staring et al. ................. 713/193

* cited by examiner

WRITE ONCE SYSTEM AND METHOD FOR FACILITATING DIGITAL ENCRYPTED TRANSMISSIONS

CROSS REFERENCE TO RELATED APPLICATION

This application is a continuation of U.S. patent application Ser. No. 09/704,329, filed Nov. 2, 2000, which is incorporated by reference as if fully set forth.

FIELD OF INVENTION

The present invention relates to a system and process for facilitating unique code encryption between a computer and an associated peripheral device. In particular, it relates to facilitating HDCP encryption or the like on a digital video interface card which digitally communicates with a digital display or monitor.

BACKGROUND

Digital display devices and other digital peripheral devices are well known in the art. Digital display devices can be designed with video signal inputs to accept either a direct digital signal and/or an analog signal which is converted to digital by the display device. Additionally, some analog display devices accept a digital video signal output.

One concern in the industry is the unauthorized of copying of copyrighted content which may be contained in a video signal. If a video signal is intercepted between transmission from a computer system to a peripheral device, such as a display, it can be used to make virtually identical copies of the video content without any degradation or loss of quality.

Some systems avoid this concern by having an analog output from the computer and an analog input to the digital display device so that only an analog signal may be intercepted. Although copies of the video content can be made based upon the analog signal, there is inherently some degradation and quality loss associated with such an analog signal which compounds when repeated copies are made using analog transmissions. However, where an analog signal is transmitted from the computer to the peripheral digital device, the signal received by the digital device is likely to be of a lower quality than if a digital signal were transmitted between the computer and the peripheral device.

In order to facilitate the transmission of digital signals from a computer to a digital peripheral device while inhibiting unauthorized content copying, encryption schemes and protocols have been developed to encrypt the digital signal before transmission from the computer and then to decrypt the signal in the digital peripheral device. One proposed protocol is high bandwidth digital content protection (HDCP) specification which requires a graphics controller to store a large set of encryption keys that are unique to the interface devices used to output an encrypted digital signal. Under HDCP, each interface device must be allocated its own unique encryption key data. Thus, each interface device or computer system must be individualized. This poses a manufacturing problem since it is more efficient to manufacture on a mass scale computer systems and/or interface cards which are identical.

It would be desirable to provide a computer system and/or interface device which can be easily mass produced, but which also can support encryption systems such as HDCP.

SUMMARY

A digital interface device is provided for facilitating key encryption of a digital signal which is communicated from a computer system to an associated peripheral device, such as a digital display device. The peripheral device decrypts the communicated digital signal during use.

The digital interface device may be built into the computer system or provided as a separate interface card. In either case, the resulting system has a digital output port, digital output formatting circuitry associated with the port and an electrically programmable non-volatile memory such as a flash RAM for storing a basic input/output system (BIOS) for, inter alia, controlling digital output formatting. The interface device is configured such that the non-volatile RAM has a specific addressable write-protectable area allocated for storing an encryption key flag at a flag address along with encryption key data. The write-protectable area being rendered read-only when a predetermined flag value is stored at the flag address. Thus, encryption key data may be stored in the specific write-protectable area of the non-volatile RAM in connection with storing the predetermined flag at that flag address such that encryption data cannot be altered when the non-volatile RAM is subsequently written to, such as when a BIOS stored in the non-volatile RAM is updated or when an attempt is made to tamper with the encryption keys.

Preferably, the digital interface device is configured to receive either a first predetermined flag value in association with key encryption data which first flag value indicates encryption enablement or a second predetermined flag value which second flag value indicates encryption disablement, in which case the digital interface device is permanently disabled from using the key encryption. If neither of the predetermined flags are contained at the flag address, the write-protectable area of the non-volatile RAM is writable to receive either the first flag value with encryption data or the disabling second flag value.

Preferably, the digital peripheral device is a digital display and the digital output port is configured to output a digital video signal. Also, it is preferred to configure the digital interface device as a digital video interface card, but the interface can be directly incorporated into a computer system's motherboard or other configuration which does not require a separate interface card.

The specific area for storing the encryption key flag and data is preferably at least 1 k bytes and is preferably located as an address range higher than an address range reserved for a BIOS in the non-volatile RAM.

As a result of the invention, identical interface cards or systems can be mass-produced and thereafter be uniquely enabled or disabled from using a digital encryption system such as HDCP in an efficient cost-effective manner.

BRIEF DESCRIPTION OF THE DRAWINGS

The above, as well as other objects of the present invention will become apparent when reading the accompanying description and drawings in which.

DESCRIPTION OF THE PREFERRED EMBODIMENTS

Figure 1:
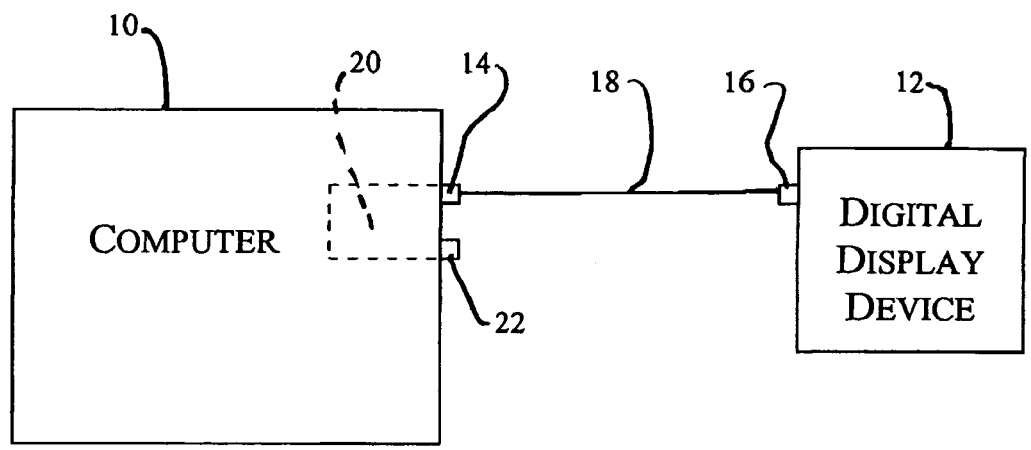
FIG. 1 is a schematic diagram of a computer and an associated digital display device which uses the digital interface of the present invention.
Figure 2:
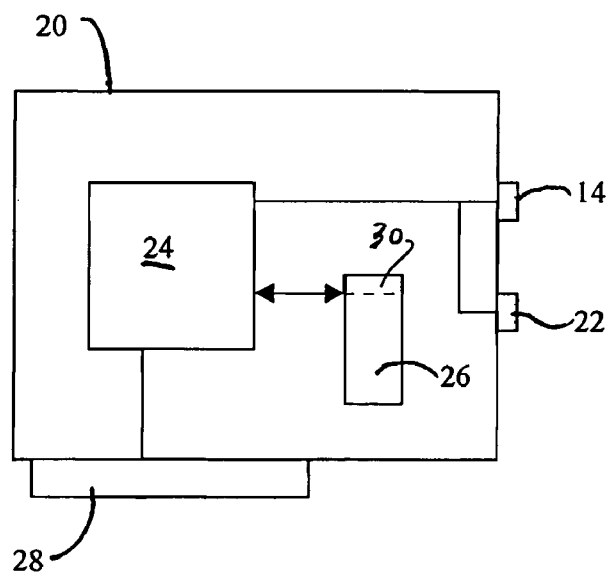
FIG. 2 is a schematic diagram of the digital interface in a preferred add-in card embodiment of the present invention.

With reference to FIG. 1, a computer system is illustrated having a computer 10 coupled with an associated digital peripheral device, such as digital display device 12. The computer 10 includes a digital video output port 14 which is coupled to a digital signal input port 16 of the digital display device 12 via conventional means such as a cable 18. The digital video signal output 14 is controlled by a digital interface device 20 such as an add-in card as illustrated in FIG. 2. The digital interface device may also include an analog port 22 so that the computer may output video signals either in digital or analog.

The digital interface device or card 20, includes graphic control circuitry 24 typically embodied in a chip known as a graphics controller. In the add-in card embodiment of the interface device 20, the graphics controlling circuitry 24 typically receives and communicates with the rest of the computer 10 via an edge card connector 28 which is typically received in an appropriate slot on a motherboard of the computer 10.

The graphics controller circuitry 24 is controlled by a basic input/output system program (BIOS) which is stored in a non-volatile RAM 26 of the interface device 20. The non-volatile RAM 26 is a conventional semi-conductor chip device which retains its memory when powered off. During normal video display operations, the non-volatile RAM acts as a read-only memory (ROM) providing the graphic control circuitry 24 with programming instructions such as, for example, the formatting of the graphic output signals. From time to time, it is desirable to upgrade the BIOS which is accomplished by writing the updated BIOS into the non-volatile RAM 26. This update operation can be controlled by the graphic control circuitry 24.

In order to inhibit the unauthorized copying of the digital signal passed through the connecting cable 18, that digital signal may be encrypted. Accordingly, the interface device is designed so that it may optionally be configured to use a proprietary encryption scheme such as HDCP. Under HDCP, the digital interface device must contain unique encryption key data which is not subject to tampering. However, it is often also desirable to use essentially the same digital interface device in systems which do not use the proprietary encryption system such as HDCP. Accordingly, in order to use the same physical hardware components to construct digital interface devices which can be permanently configured to allow or disallow use of a proprietary encryption scheme such as HDCP, the non-volatile RAM 26 of the digital interface device 20 of the present invention contains a specified write-protectable area 30 of preferably at least 512 bytes which operates as a write-once memory within the non-volatile RAM 26. Accordingly, the control circuitry 24 which controls the writing to the non-volatile RAM 26 is configured to check a specific flag address within the allocated write-once address area 30 of the non-volatile RAM 26. Preferably, a flag address check by the controller is conducted automatically on power up of the system and any reinitialization of the graphics controller. If the flag address contains a predetermined value, the specified address area within the non-volatile RAM 26 is write-protected and the controller 24 can only write information into other areas of the non-volatile RAM 26. In lieu of a single flag address, multiple addresses may be provided which are checked for a certain state or combination of states for write protection enablement.

Preferably, the specified area 30 for the encryption information is at the highest address range of the non-volatile RAM 26. For example, if a 64 k byte non-volatile RAM is provided having addresses 0x0000 to 0xFFFF, a 1 k byte area having addresses from 0xFC00 to 0xFFFF (63 k to 64k–1) is designated as the specific write-protectable area 30 within the non-volatile RAM for encryption information. Preferably, the encryption key flag address is at the first byte of the specified area, i.e. preferably at 0xFC00 (63 k).

The flag itself may have more than one predetermined value to render the entire specified area 30 as write-protected. For example, the interface device can be configured to recognized the ASCII character "H" as a write-protect flag which also indicates enablement of HDCP encryption and the storage of valid HDCP keys within the write-protected block. A value corresponding to ASCII "h" can be used to indicate write-protection, but that the HDCP encryption is disabled. If neither ASCII "H" or "h" is stored at the flag address, the allocated area would not be write-protected in such an example. Preferably, however, only a single unique flag value is used for each different state, i.e. only "H" for the write protect HDCP encryption enabled state and "h" for write protect HDCP encryption disabled state.

Alternatively, the predetermined value may be inferentially set by specifying that the area 30 is write-protected if it contains any value other than, for example, an ASCII "W", thus, indicating the area 30 is writable. Preferably, the "W" value, if used, is initially stored at the flag address when the specified area 30 is allocated.

If the interface devices were shipped without a predetermined flag stored at the flag address to write-protect the specified area 30, the interface device could be subject to third party tampering. Accordingly, one of the final production step is preferably to either store encryption keys within the designated area 30 and set the flag address to "H" or set the flag address to "h" to disable HDCP encryption functions. Since royalties may be payable for creating devices which utilize encryption schemes such as HDCP, no royalties would be due with respect to interface devices where the encryption is permanently disabled.

By allocating the highest addresses 0xFC00 to 0xFFFF (63 k to 64 k–1) to the specified write-protectable area 30, the remainder of the non-volatile RAM at addresses 0x0000 to 0xFBFF (0 k to 63 k–1) is free to be used for the existing BIOS or any updated BIOS. Typical BIOS images range between 40 to 48 k bytes. Accordingly, even if BIOS updates become larger in size, there is sufficient room within a 64 k byte flash RAM to be accommodated since only the uppermost kilobyte of the flash RAM is used. If a 128K flash RAM is utilized, the write-protectable area 30 is preferably located at address range 0x1FC00 to 0x1FFFF (127 k to 128 k–1) with the flag address at 0x1FC00 (127 k).

Before the flag is set, the specified write-protectable area 30 can be written into in a manner suitable for storing the encryption information. Preferably, the first four bytes of the area receive values corresponding to ASCII characters "H", "D", "C", "P", when the area is written to with encryption key data of the type usable by the HDCP encoding system. Preferably, the first thirteen bytes of the area 30 are written with values corresponding to ASCII characters "h", "d", "c", "p", " ", "d", "i", "s", "a", "b", "l", "e", "d", when written to permanently disable HDCP encryption.

What is claimed is:

1. A digital device for facilitating use of encryption for digital signals, the interface device comprising:
   a non-volatile memory having a write-protectable area allocated for storing an encryption flag at a flag address and encryption data; and
   said write-protectable area configured such that it is rendered read-only when a predetermined flag value is stored at said flag address whereby encryption data stored in said write-protectable area of said non-volatile memory cannot be altered by a write operation to said non-volatile memory after said write-protectable area is rendered read-only.

2. A digital device according to claim 1 further comprising:
digital processing circuitry associated with said memory and configured to decrypt encrypted digital signals using encryption data stored in said write-protectable area such that an encrypted signal is decrypted when appropriate encryption data is stored in said write-protectable area.

3. A digital device according to claim 1 configured to store a first predetermined flag value at said flag address in association with encryption data in said specific write-protectable area which first flag value indicates encryption enablement.

4. A digital device according to claim 1 configured to store either a first predetermined flag value at said flag address in association with encryption data in said specific write-protectable area which first flag value indicates encryption enablement or a second predetermined flag value at said flag address which second flag value indicates encryption disablement in which case the digital device is permanently disabled from storing encryption data in said write-protectable area.

5. A digital device according to claim 1 configured to store as said predetermined value any value other than a specific value which specific value enables writing into said write-protectable area.

6. A digital device according to claim 1 wherein said flag is configured as a combination of one or more values stored at the one or more flag addresses within said write-protectable area.

7. A digital device according to claim 1 further comprising:
digital processing circuitry associated with said memory and configured to decrypt encrypted digital video signals using encryption data stored in said write-protectable area such that an encrypted signal is only decrypted when appropriate encryption data is stored in said write-protectable area; and
an output port associated with the digital processing circuitry configured to output a digital video signal.

8. A digital device according to claim 6 which is configured as a digital video interface card.

9. A digital device according to claim 1 wherein said specific writeprotectable area is at least 512 k bytes and located at an address range higher than an address range reserved for a BIOS within said non-volatile memory.

10. The digital device of claim 1 configured to use said predetermined flag value to determine enablement of High bandwidth Digital Content Protection (HDCP) encryption.

11. The digital device of claim 10 configured to store as said encryption data HDCP encryption keys.

12. A method for facilitating the use of digital encryption comprising:
providing a digital device having a non-volatile memory;
allocating a specific addressable area on said non-volatile memory for storing an encryption flag and encryption data; and
rendering said specific area read-only when a predetermined flag value is written in said specific addressable area at a flag address.

13. A method according to claim 12 further comprising:
writing a first predetermined flag value at said flag address along with encryption data in said specific area to enable decryption of a digital signal using the encryption data.

14. A method according to claim 12 further comprising:
writing a first predetermined flag value at said flag address along with encryption data in said specific area to enable key decryption of a digital signal using the encryption data; or
writing a second predetermined flag value at said flag address to permanently disable decryption using data stored in said specific area.

15. A method according to claim 12 further comprising storing a specific value in said flag address at the time the specific addressable area is allocated wherein said predetermined key value is any value other than said specific value.

16. A method according to claim 12 further comprising providing digital processing circuitry associated with said non-volatile memory and configured to decrypt encrypted digital signals using encryption data stored in said write-protectable area.

17. A configurable device for providing decryption of encrypted signals comprising:
a memory having a write-protectable area allocated for storing an encryption flag at a flag address and encryption data; and
said write-protectable area configured such that it is rendered read-only when a predetermined flag value is stored at said flag address whereby the ability to alter encryption data stored in said write-protectable area of said memory is dependent upon said flag value.

18. The configurable device of claim 17 configured to store as said predetermined flag value at least one of a plurality of predetermined values.

19. The configurable device of claim 17 configured to use said predetermined flag value to determine enablement of High bandwidth Digital Content Protection (HDCP) encryption.

20. The configurable device of claim 19 configured to store as said encryption data HDCP encryption keys.

* * * * *